United States Patent [19]

Hanamura et al.

[11] Patent Number: 5,691,877

[45] Date of Patent: Nov. 25, 1997

[54] CHIP TYPE THICK FILM CAPACITOR AND METHOD OF MAKING THE SAME

[76] Inventors: Toshihiro Hanamura; Shigeru Kambara, both c/o Rohm Co., Ltd. 21, Saiin Mizosaki-cho, Ukoyu Kyoto 615, Japan

[21] Appl. No.: 596,326

[22] Filed: Feb. 16, 1996

[30] Foreign Application Priority Data

Aug. 26, 1994 [JP] Japan .................. 6-201669
Aug. 26, 1994 [JP] Japan .................. 6-201670

[51] Int. Cl.⁶ .............. H01G 4/06; H01G 4/005; H01G 4/428; H01G 7/00
[52] U.S. Cl. .............. 361/313; 361/303; 361/308.1; 361/310; 29/25.42; 437/51; 437/60
[58] Field of Search .............. 361/303–305, 361/306.1, 306.3, 308.1, 310–313, 320; 333/172; 29/25.41, 25.42; 437/51, 60

[56] References Cited

U.S. PATENT DOCUMENTS 3,490,055  1/1970  Cox .
3,949,275  4/1976  Muenz .
4,410,867  10/1983  Arcidiacono et al. .................. 333/172
5,420,553  5/1995  Sakamono et al. .................. 333/172

FOREIGN PATENT DOCUMENTS 2114289  5/1973  Germany .
5047597  2/1993  Japan .

*Primary Examiner*—Bot L. Ledynh

[57] ABSTRACT

A chip type thick film capacitor is provided which comprises an insulating chip (11) serving as a substrate and having a head surface (11a). The chip head surface (11a) is formed with a first lead electrode (12) and a second lead electrode (13) spaced from the first lead electrode (12). The chip head surface (11a) is also formed with a first capacitor electrode (14) in electrical conduction with the first lead electrode (12). The chip head surface (11a) is further formed with an auxiliary electrode (20) which is held in electrical conduction with the second lead electrode (13) but spaced from the first capacitor electrode (14) by a predetermined distance (D1). A dielectric layer (15) is formed on the first capacitor electrode (14), and a second capacitor electrode (16) is formed on the dielectric layer (15) in electrical conduction with the auxiliary electrode (20).

8 Claims, 8 Drawing Sheets

CHIP TYPE THICK FILM CAPACITOR AND METHOD OF MAKING THE SAME

FIELD OF THE INVENTION

This invention relates to a chip type thick film capacitor wherein a capacitor element is formed on an insulating chip substrate. The present invention also relates to a chip type thick film capacitor which incorporates a resistor to work as a composite device. Moreover, the present invention further relates to a method of advantageously making a chip type thick film capacitor.

BACKGROUND ART

A chip type thick film capacitor has been found advantageous in that it can be manufactured relatively easily by using a screen-printing method. Therefore, the chip type capacitor is increasingly used in various applications.

Typically, a chip type thick film capacitor has such a structure as shown in FIGS. 18 and 19 of the accompanying drawings. Specifically, the capacitor comprises an insulating chip 1 made of a ceramic material for example. The chip 1 has a head surface 1a, a tail surface 1b opposite to the head surface 1a, a first side surface 1c, and a second side surface 1d opposite to the first side surface 1c.

The head surface 1a of the chip 1 is formed with a first lead electrode 2 and a second lead electrode 3 spaced from the first lead electrode 12. The first lead electrode 2 has an extension 2a extending onto the first side surface 1c of the chip 1. Similarly, the second lead electrode 3 has an extension 3a extending onto the second side surface 1d of the chip 1. As shown in FIG. 18, the respective extensions 2a, 3a of the first and second lead electrodes 2, 3 may further extend slightly onto the tail surface 1b of the chip 1.

The head surface 1a of the chip 1 is also formed with a first capacitor electrode 4 partially overlapping on the first lead electrode 2. A dielectric layer 5 is formed on the first capacitor electrode 4 to extend to the head surface 1a of the chip 1 between the first lead electrode 3 and the first capacitor electrode 4. Further, a second capacitor electrode 6 is formed on the dielectric layer 5 to partially overlap on the second lead electrode 3. Moreover, a protective overcoat layer 7 is formed to cover the first capacitor electrode 4, the dielectric layer 5, the second capacitor electrode 6, a part of the first lead electrode 2, and a part of the second lead electrode 3. The overcoat layer 7 may be preferably made of glass for example.

In manufacture of the prior art chip type capacitor, a first screen-printing step is performed for forming the first and second lead electrodes 2, 3 together, followed by a second screen-printing step for forming the first capacitor electrode 4. Thus, if the screen used for the second screen-printing step is improperly positioned, the first capacitor electrode 4 may unexpectedly deviates in position toward the second lead electrode 3 to come into electrical conduction therewith. As a result, the capacitor may become inoperative due to electrical shorting between the first and second capacitor electrodes 4, 6.

On the other hand, another chip type thick film capacitor is also known which additionally incorporates a resistor, as shown in FIGS. 20 and 21 of the accompanying drawings. Specifically, the capacitor shown in FIGS. 20 and 21 comprises an insulating chip 11' which has a head surface 1a', a tail surface 1b' opposite to the head surface 1a', a first side surface 1c', and a second side surface 1d' opposite to the first side surface 1c'.

The head surface 1a' of the chip 1' is formed with a first lead electrode 2' and a second lead electrode 3' spaced from the first lead electrode 2'. The first lead electrode 2' has an extension 2a' extending onto the first side surface 1c' of the chip 1'. Similarly, the second lead electrode 3' has an extension 3a' extending onto the second side surface 1d' of the chip 1'.

The head surface 1a' of the chip 1' is also formed with a first capacitor electrode 4' which is insulated from the second lead electrode 3'. The first capacitor electrode 4' is spaced from the first lead electrode 2' by a predetermined distance L but electrically connected to the first lead electrode 2' via a resistor layer 8 formed on the head surface 1a' of the chip 1'.

A dielectric layer 5' is formed on the first capacitor electrode 4' to extend to the head surface 1a' of the chip 1' between the first capacitor electrode 4' and the second lead electrode 3'. Further, a second capacitor electrode 6' is formed on the dielectric layer 5' to partially overlap on the second lead electrode 3'. Moreover, a protective overcoat layer 7' is formed to cover the first capacitor electrode 4', the dielectric layer 5', the second capacitor electrode 6', the resistor layer 8, a part of the first lead electrode 2', and a part of the second lead electrode 3'.

The prior art capacitor shown in FIGS. 20 and 21 works dually as a capacitor and a resistor. However, the first capacitor electrode 4' is formed separately from the first and second capacitor electrodes 2', 3' by screen-printing, a positional deviation of the first capacitor electrode 4' relative to the first lead electrode 3' results in resistance variations of the resistor layer 8.

DISCLOSURE OF THE INVENTION

It is, therefore, an object of the present invention is to provide a chip type thick film capacitor which can be manufactured without causing the problem of shorting between the two poles of the capacitor.

Another object of the present invention is to provide a chip type thick film capacitor which additionally incorporates a resistor having a reliably adjusted resistance.

A further object of the present invention is to provide an improved method of making a chip type thick film capacitor which may or may not incorporate a resistor.

According to one aspect of the present invention, there is provided a chip type thick film capacitor comprising:

an insulating chip serving as a substrate and having a head surface;

a first lead electrode formed on the head surface of the chip;

a second lead electrode formed on the head surface of the chip and spaced from the first lead electrode;

a first capacitor electrode formed on the head surface of the chip, the first capacitor electrode being electrically connected to the first lead electrode but electrically insulated from the second lead electrode;

a dielectric layer formed on the first capacitor electrode;

a second capacitor electrode formed on the dielectric layer, the second capacitor electrode being electrically connected to the second lead electrode but electrically insulated from the first lead electrode; and an auxiliary electrode formed on the head surface of the chip in electrical conduction with one of the first and second lead electrodes, the auxiliary electrode being spaced from the first capacitor electrode by a predetermined distance.

In one embodiment of the present invention, the auxiliary electrode may be held in electrical conduction with the second lead electrode and the second capacitor electrode.

In another embodiment of the present invention, the auxiliary electrode may be held in electrical conduction with the first lead electrode, whereas the first capacitor electrode may be electrically connected to the auxiliary electrode via a resistor layer formed on the head surface of the chip between the first capacitor electrode and the auxiliary electrode. In such an embodiment, the first lead electrode may preferably have a pair of laterally spaced leg portions which are bridged by the auxiliary electrode, whereas the resistor layer partially overlaps on the auxiliary electrode between the leg portions of the first lead electrode. Alternatively, the first lead electrode may have a leg portion which is laterally offset toward one longitudinal edge of the chip and partially overlapped by the auxiliary electrode, whereas the resistor layer partially overlaps on the auxiliary electrode at a position laterally spaced from the leg portion of the first lead electrode.

In either of the above-described embodiments, each of the first and second lead electrode has an extension extending onto a side surface of the chip for conveniently soldering on a circuit board for example.

According to another aspect of the present invention, there is provided a method of making a chip type thick film capacitor, comprising the steps of:

simultaneously forming a first lead electrode and a second lead electrode on a head surface of an insulating chip, the first and second lead electrodes being spaced from each other;

simultaneously forming a first capacitor electrode and an auxiliary electrode on the head surface of the chip, the first capacitor electrode being electrically connected to the first lead electrode, the auxiliary electrode being electrically connected to the second lead electrode but spaced from the first capacitor electrode by a predetermined distance;

forming a dielectric layer on the first capacitor electrode;

forming a second capacitor electrode on the dielectric layer, the second capacitor electrode being electrically connected to the auxiliary electrode.

According to a further aspect of the present invention, there is provided a method of making a chip type thick film capacitor which also incorporates a thick film resistor, the method comprising the steps of:

simultaneously forming a first lead electrode and a second lead electrode on a head surface of an insulating chip, the first and second lead electrodes being spaced from each other;

simultaneously forming a first capacitor electrode and an auxiliary electrode on the head surface of the chip, the first capacitor electrode being spaced from both of the first and second lead electrodes, the auxiliary electrode being electrically connected to the first lead electrode but spaced from the first capacitor electrode by a predetermined distance;

forming a resistor layer on the head surface of the chip to extend between the first capacitor electrode and the auxiliary electrode;

forming a dielectric layer on the first capacitor electrode;

forming a second capacitor electrode on the dielectric layer, the second capacitor electrode being electrically connected to the second lead electrode.

Other objects, features and advantages of the present invention will be fully understood from the following detailed description given with reference to the accompanying drawings.

BEST MODE FOR CARRYING OUT THE INVENTION

Figure 1:
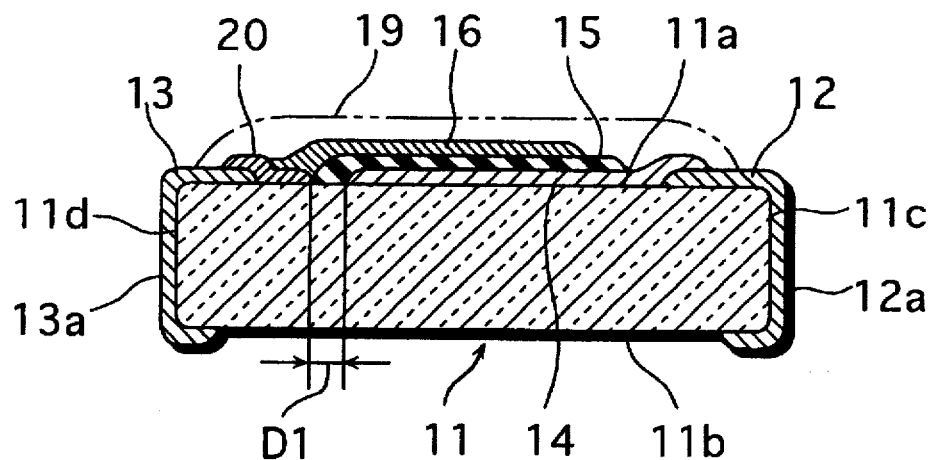
FIG. 1 is a sectional view showing a chip type thick film capacitor embodying the present invention.
Figure 2:
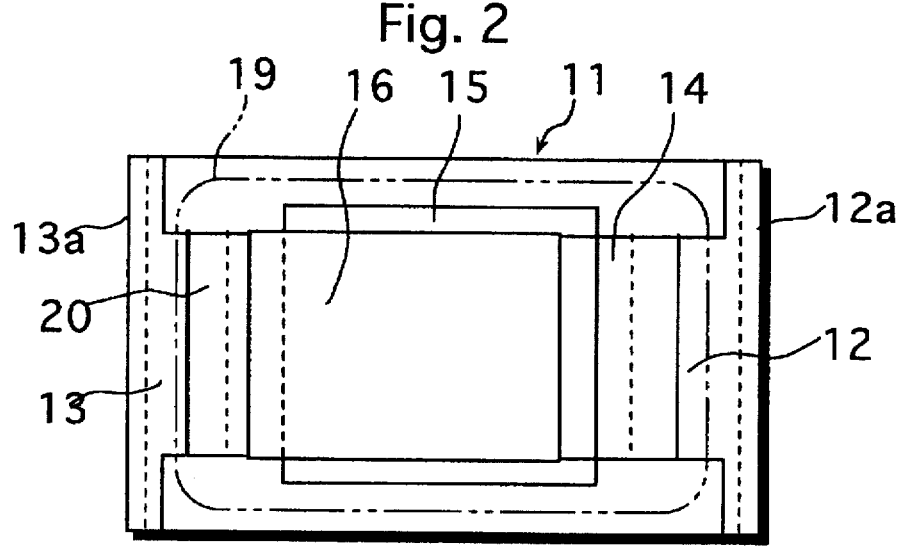
FIG. 2 is a plan view of the same capacitor.

Referring first to FIGS. 1 and 2 of the accompanying drawings, there is illustrated a chip type thick film capacitor according to a first embodiment of the present invention. The capacitor comprises an insulating chip 11 made of a ceramic material for example. The chip 11 has a head or upper surface 11a, a tail or lower surface 11b opposite to the head surface 11a, a first side surface 11c, and a second side surface 11d opposite to the first side surface 11c.

The head surface 11a of the chip 11 is formed with a first lead electrode 12 and a second lead electrode 13 spaced from the first lead electrode 12. The first lead electrode 12 has an extension 12a extending onto the first side surface 11c of the chip 11. Similarly, the second lead electrode 13 has an extension 13a extending onto the second side surface 11d of the chip 11. As shown in FIG. 1, the respective extensions 12a, 13a of the first and second lead electrodes 12, 13 may further extend slightly onto the tail surface 11b of the chip 11.

The head surface 11a of the chip 11 is also formed with a first capacitor electrode 14 partially overlapping on the first lead electrode 12. The head surface 11a of the chip 11 is further formed with an auxiliary electrode 20 partially overlapping on the second lead electrode 13 but spaced from the first capacitor electrode 14 by a predetermined distance D1.

A dielectric layer 15 is formed on the first capacitor electrode 14 to extend to the head surface 11a of the chip 11 between the first capacitor electrode 14 and the auxiliary electrode 20. Further, a second capacitor electrode 16 is formed on the dielectric layer 15 to partially overlap on the auxiliary electrode 20. Thus, the second capacitor electrode 16 is electrically connected to the second lead electrode 13 indirectly via the auxiliary electrode 20, whereas the first capacitor electrode 14 is electrically connected directly to the first lead electrode 12. In operation, an electric charge can be retained between the first and second capacitor electrodes 14, 16 which is separated by the dielectric layer 15.

As shown in FIGS. 1 and 2, a protective overcoat layer 19 is formed to cover the first capacitor electrode 14, the dielectric layer 15, the second capacitor electrode 16, the auxiliary electrode 20, a part of the first lead electrode 12, and a part of the second lead electrode 13. The overcoat layer 19 may be preferably made of glass for example.

In use, the chip type capacitor having the above-described structure is mounted on a suitable portion of a circuit board and bonded thereto by soldering. To improve or facilitate the solder bonding, the first and second lead electrodes 12, 13 with their respective extensions 12a, 13a may be plated with a suitable metal which has good affinity or adhesion to solder.

The chip type capacitor according to the first embodiment may be manufactured in the following manner.

Figure 3:
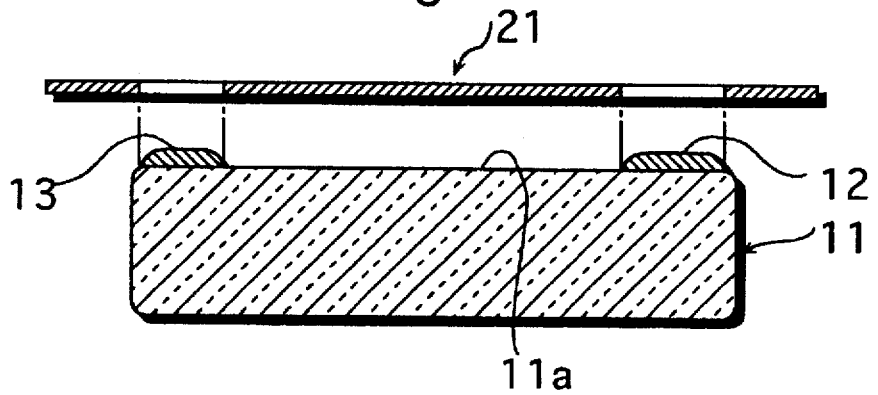
FIGS. 3 through 6 are sectional views showing the successive steps of making the same capacitor.

First, as shown in FIG. 3, a first lead electrode 12 and a second lead electrode 13 are formed simultaneously on the head surface 11a of an insulating chip 11 by printing an electrically conductive paste with the use of a first screen 21.

Figure 4:
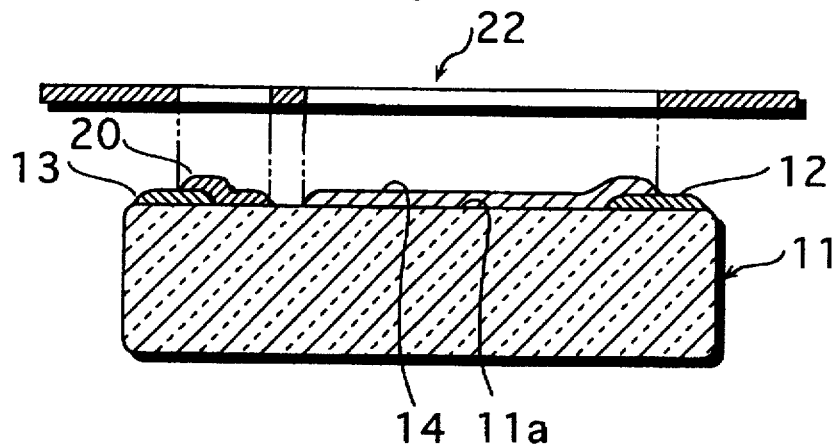

Then, as shown in FIG. 4, a first capacitor electrode 14 and an auxiliary electrode 20 are formed simultaneously on the head surface 11a of the chip 11 by printing an electrically conductive paste with the use of a second screen 22.

Figure 5:
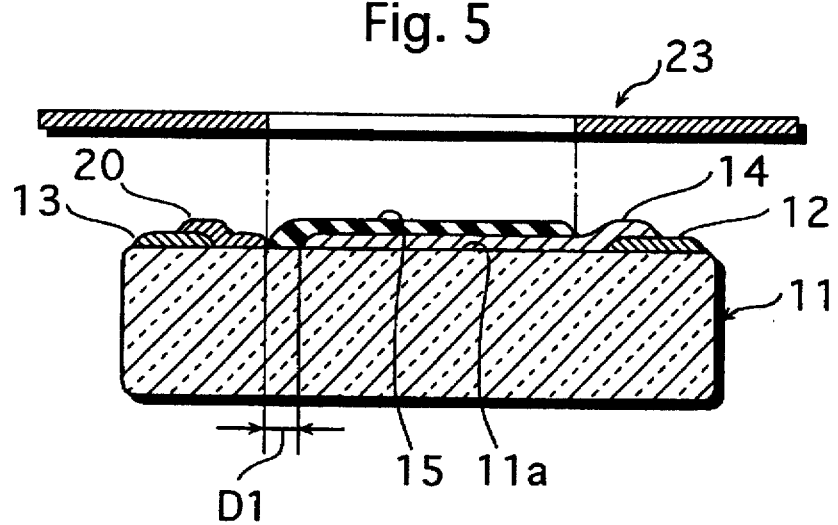

Then, as shown in FIG. 5, a dielectric layer 15 is formed on the first capacitor electrode 14 by printing a pasty insulating or dielectric material with the use of a third screen 23.

Figure 6:
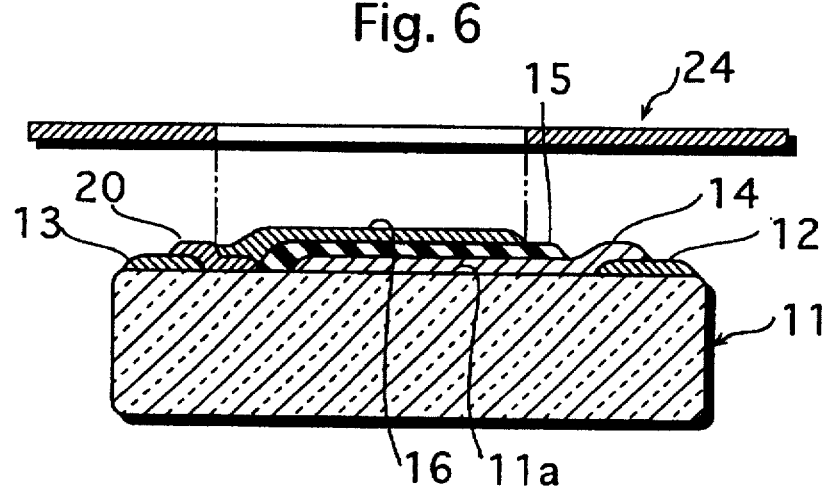

Then, as shown in FIG. 6, a second capacitor electrode 16 is formed on the dielectric layer 15 by printing an electrically conductive paste with the use of a fourth screen 24.

Then, extensions 12a, 13a (see FIG. 1) for the first and second lead electrodes 12, 13 are formed on the respective side surfaces 11c, 11d of the chip 11 by using the same electrically conductive paste as used for the first and second lead electrodes 12, 13.

Then, a protective overcoat layer 19 (see FIG. 1) is formed over the previously formed electrodes 12, 13, 12 and 14 by applying a glass paste.

Finally, the first and second lead electrodes 12, 13 with their respective extensions 12a, 13a are subjected to metal plating.

According to the first embodiment described above, the first capacitor electrode 14 and the auxiliary electrode 20 are formed simultaneously on the head surface 11a of the chip 11 by using the second screen 22, as shown in FIG. 4. Thus, the predetermined spacing D1 is reliably provided between the first capacitor electrode 14 and the auxiliary electrode 20 even if the second screen 22 positionally deviates slightly relative to the previously formed lead electrodes 12, 13. In other words, it is possible to prevent the first capacitor electrode 14 from being electrically shorted to the second lead electrode 13 and the second capacitor electrode 16.

Figure 7:
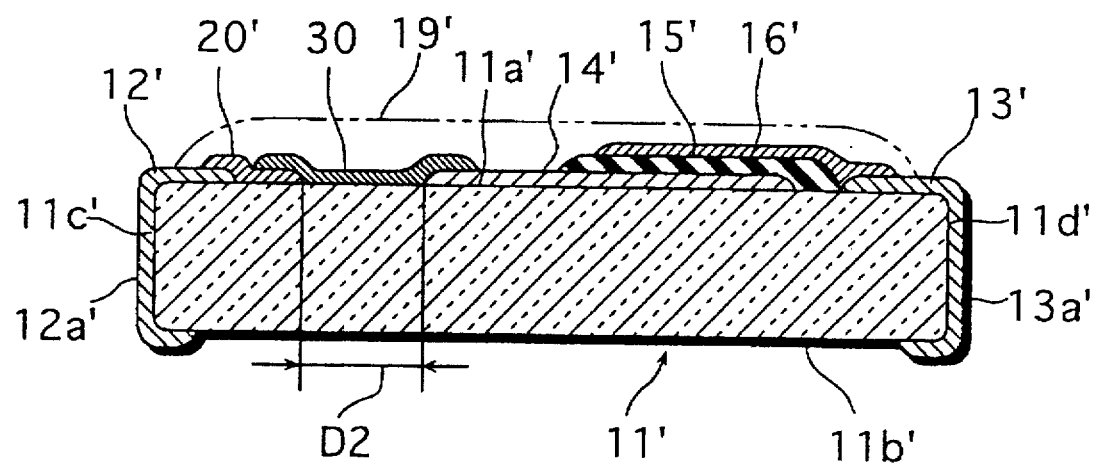
FIG. 7 is a sectional view showing another chip type thick film capacitor embodying the present invention.
Figure 8:
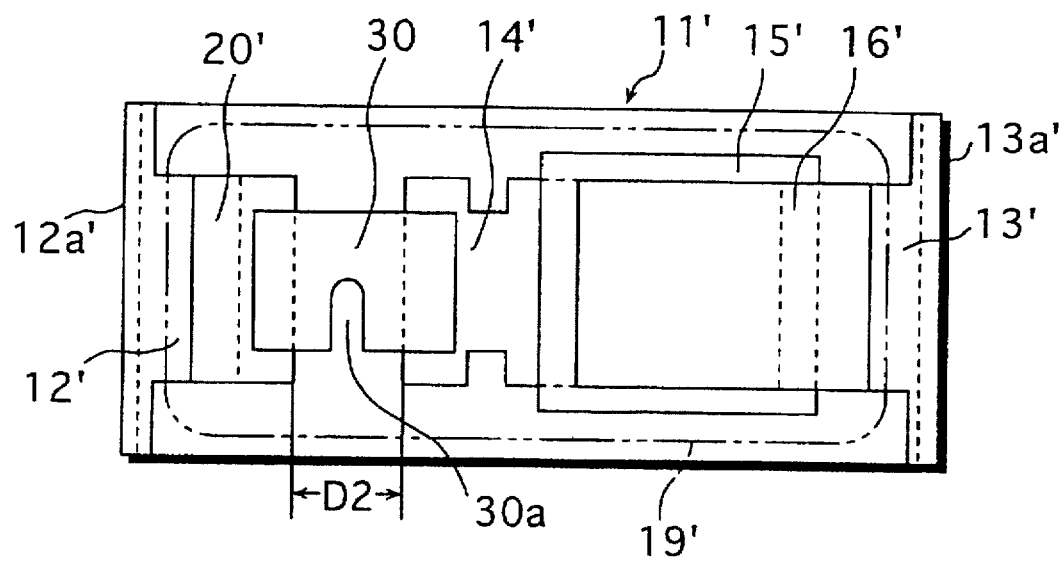
FIG. 8 is a plan view showing the capacitor of FIG. 7.

FIGS. 7 and 8 show a chip type thick film capacitor according to a second embodiment of the present invention. The capacitor of this embodiment is a composite device which, in addition to serving as a capacitor, works also as a resistor, as described below.

The composite capacitor device comprises an insulating chip 11' made of a ceramic material for example. The chip 11' has a head surface 11a', a tail surface 11b' opposite to the head surface 11a', a first side surface 11c', and a second side surface 11d' opposite to the first side surface 11c'.

The head surface 11a' of the chip 11' is formed with a first lead electrode 12' and a second lead electrode 13' spaced from the first lead electrode 12'. The first lead electrode 12' has an extension 12a' extending onto the first side surface 11c' of the chip 11'. Similarly, the second lead electrode 13' has an extension 13a' extending onto the second side surface 11d' of the chip 11'. As shown in FIG. 7, the respective extensions 12a', 13a' of the first and second lead electrodes 12', 13' may further extend slightly onto the tail surface 11b' of the chip 11'.

The head surface 11a' of the chip 11' is also formed with a first capacitor electrode 14' spaced from both of the first and second lead electrodes 12', 13'. The head surface 11a' of the chip 11' is further formed with an auxiliary electrode 20' partially overlapping on the first lead electrode 12' but spaced from the first capacitor electrode 14' by a predetermined distance D2. In the second embodiment, however, the first capacitor electrode 14' is electrically connected indirectly to the first lead electrode 12' via the auxiliary electrode 20' as well as via a resistor layer 30 which is formed on the head surface 11a' of the chip 11' between the first capacitor electrode 14' and the auxiliary electrode 20'.

A dielectric layer 15' is formed on the first capacitor electrode 14' to extend to the head surface 11a' of the chip 11' between the first capacitor electrode 14' and the second lead electrode 13'. Further, a second capacitor electrode 16' is formed on the dielectric layer 15' to partially overlap on the second lead lead electrode 13'. Thus, the second capacitor electrode 16' is electrically connected directly to the second lead electrode 13'.

As shown in FIGS. 7 and 8, a protective overcoat layer 19' is formed to cover the first capacitor electrode 14', the dielectric layer 15', the second capacitor electrode 16', the auxiliary electrode 20', the resistor layer 30, a part of the first lead electrode 12', and a part of the second lead electrode 13'. The overcoat layer 19' may be preferably made of glass for example.

In use, the composite capacitor device having the above-described structure is mounted on a suitable portion of a circuit board and bonded thereto by soldering. To improve or facilitate the solder bonding, the first and second lead electrodes 12', 13' with their respective extensions 12a', 13a' may be plated with a suitable metal which has good affinity or adhesion to solder.

In operation, an electric charge can be retained between the first and second capacitor electrodes 14', 16' which is separated by the dielectric layer 15', and charging occurs through the resistor layer 30. Further, the retained electric charge can be discharged from the capacitor through the resistor layer 30. The resistance of the resistor layer 30 may be adjusted by a trimming groove 30a (see FIG. 8) of the resistor layer 30 to control the rate of electric charging and discharging of the capacitor.

The chip type capacitor according to the second embodiment may be manufactured in the following manner.

Figure 9:
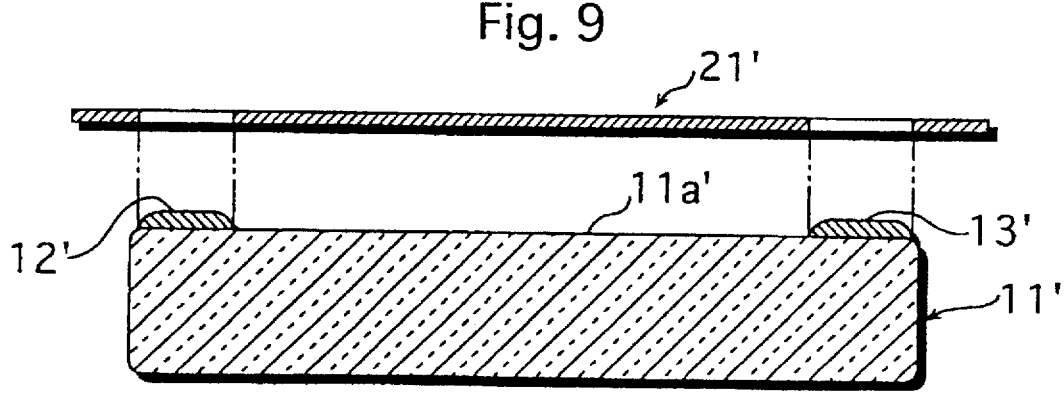
FIGS. 9 through 13 are sectional views showing the successive steps of making the capacitor of FIGS. 7 and 8.

First, as shown in FIG. 9, a first lead electrode 12' and a second lead electrode 13' are formed simultaneously on the head surface 11a' of an insulating chip 11' by printing an electrically conductive paste with the use of a first screen 21'.

Figure 10:
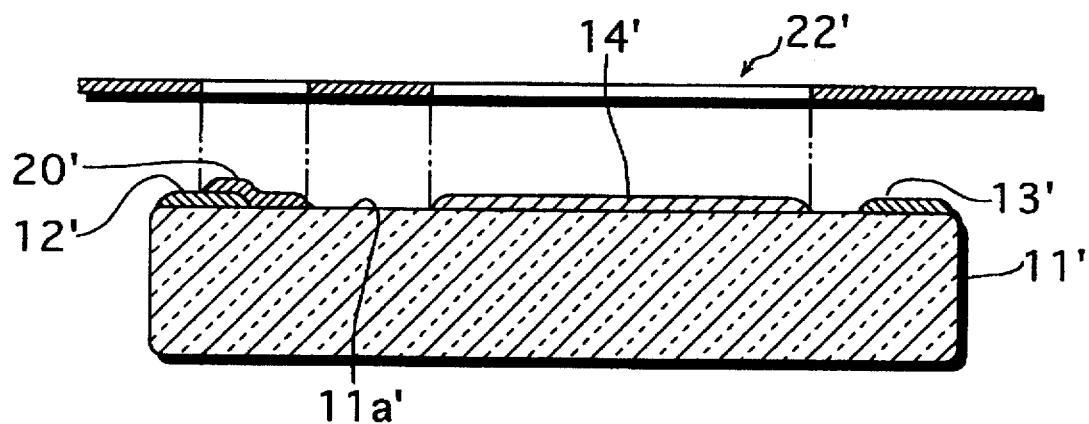

Then, as shown in FIG. 10, a first capacitor electrode 14' and an auxiliary electrode 20' are formed simultaneously on the head surface 11a' of the chip 11' by printing an electrically conductive paste with the use of a second screen 22'.

Figure 11:
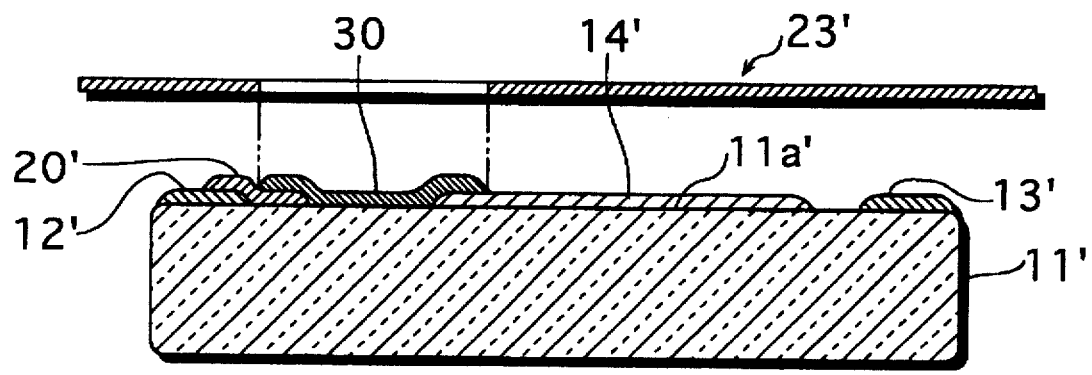

Then, as shown in FIG. 11, a resistor layer 30 is formed on the head surface 11a' of the chip 11' by printing a resistor material paste with the use of a third screen 23'.

Figure 12:
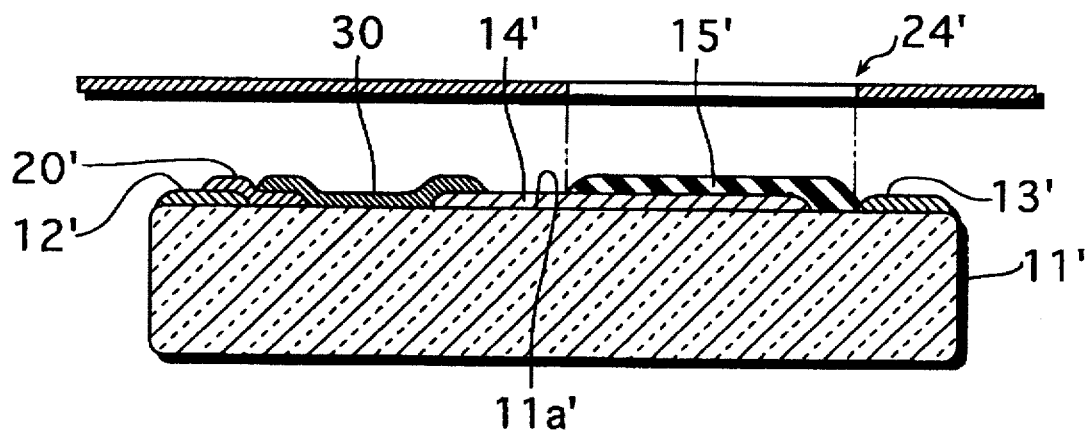

Then, as shown in FIG. 12, a dielectric layer 15' is formed on the first capacitor electrode 14' by printing a pasty insulating or dielectric material with the use of a fourth screen 24'.

Figure 13:
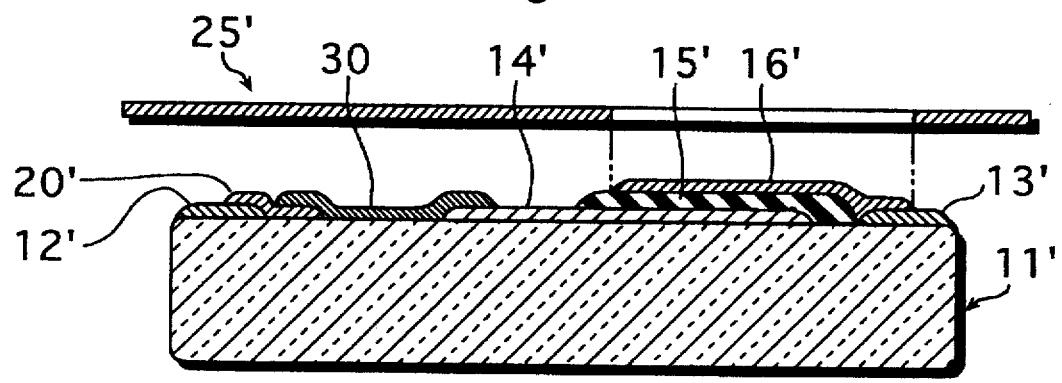

Then, as shown in FIG. 13, a second capacitor electrode 16' is formed on the dielectric layer 15' by printing an electrically conductive paste with the use of a fifth screen 25'.

Then, extensions 12a', 13a' (see FIG. 7) for the first and second lead electrodes 12', 13' are formed on the respective side surfaces 11c', 11d' of the chip 11' by using the same electrically conductive paste as used for the first and second lead electrodes 12', 13'.

Then, a protective overcoat layer 19' (see. FIG. 7) is formed over the previously formed electrodes 12', 13', 14' and 16' by applying a glass paste.

Finally, the first and second lead electrodes 12', 13' with their respective extensions 12a', 13a' are subjected to metal plating.

According to the second embodiment described above, the first capacitor electrode 12' and the auxiliary electrode 20' are formed simultaneously on the head surface 11a' of the chip 11' by using the second screen 22', as shown in FIG. 10. Thus, the predetermined spacing D2 is reliably provided between the first capacitor electrode 14' and the auxiliary electrode 20' even if the second screen 22' positionally deviates slightly relative to the previously formed lead electrodes 12', 13'. As a result, the resistor layer 30 subsequently formed on the head surface 11a' of the chip 11' to extend between the capacitor electrode 14' and the auxiliary electrode 20' can be always made to have a predetermined effective length, thereby facilitating adjustment of the resistance of the resistor layer 30.

Figure 14:
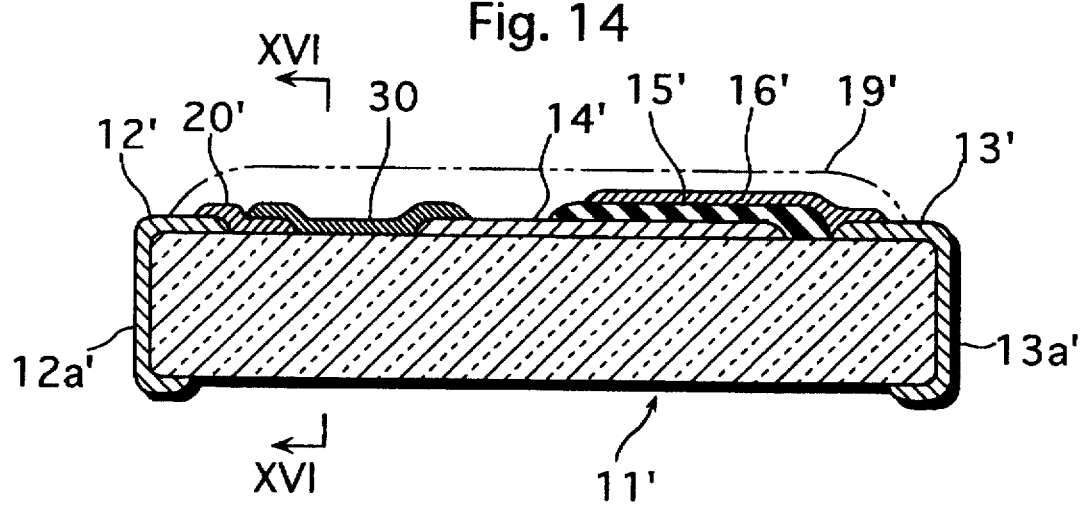
FIG. 14 is a sectional view showing a further chip type thick film capacitor embodying the present invention.
Figure 15:
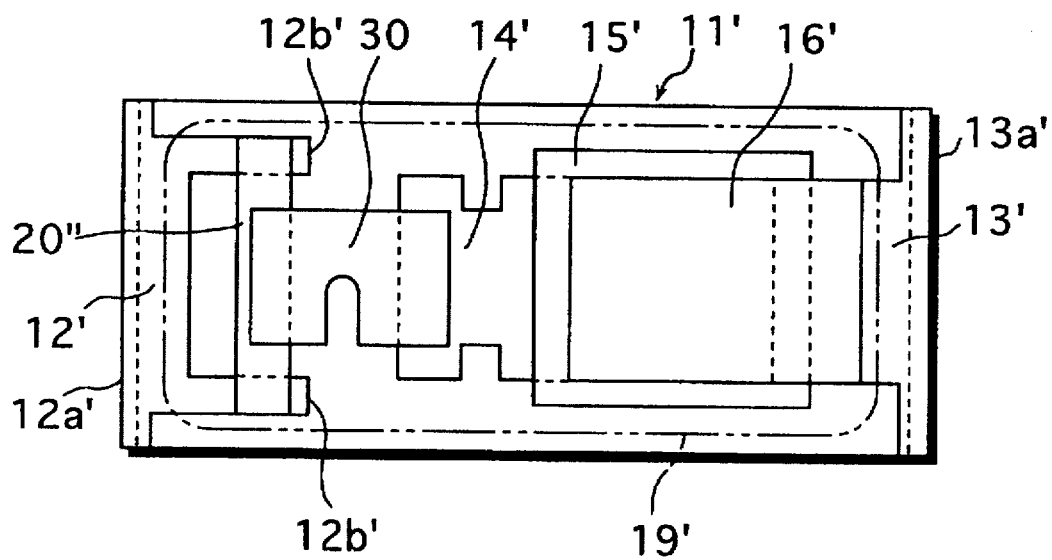
FIG. 15 is a plan view showing the capacitor of FIG. 15.
Figure 16:
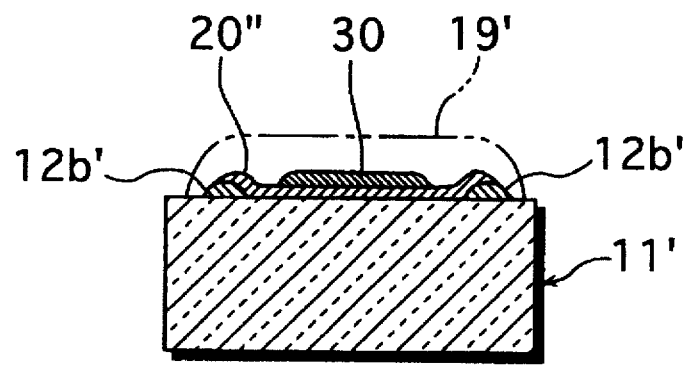
FIG. 16 is a sectional view taken along lines XVI—XVI in FIG. 14.

FIGS. 14 through 16 show a chip type thick film capacitor according to a third embodiment of the present invention. The capacitor of this embodiment is similar to that of the second embodiment (FIGS. 7 and 8) but differs therefrom only in the following respects.

First, the first lead electrode 12' is made to have a pair of laterally spaced leg portions 12b' extending on the head surface 11a' of the chip 11', as best shown in FIG. 15.

Secondly, an auxiliary electrode 20" is formed to extend between the leg portions 12b' of the first lead electrode 12'. As shown in FIGS. 15 and 16, the auxiliary electrode 20" partially overlaps, at its both ends, on the respective leg portions 12b' to establish electrically connection to the first lead electrode 12', whereas the resistor layer 30 partially overlaps on the auxiliary electrode 20" centrally between the respective leg portions 12b' of the first lead electrode 12'.

According to the third embodiment illustrated in FIGS. 14 to 17, since the auxiliary electrode 20" is made to extend between the respective leg portions 12b' of the first lead electrode 12', the resistor layer 30 partially overlaps only on the auxiliary electrode 20" even if the resistor layer 30 positionally deviates toward the first lead electrode 12'. Thus, it is possible to prevent formation of a triply layered portion which might occur in the second embodiment (FIGS. 7 and 8) if the resistor layer 30 positionally deviates toward the first lead electrode 12' due to a positional deviation of the third screen 23' (FIG. 11) in forming the resistor layer 30.

Figure 17:
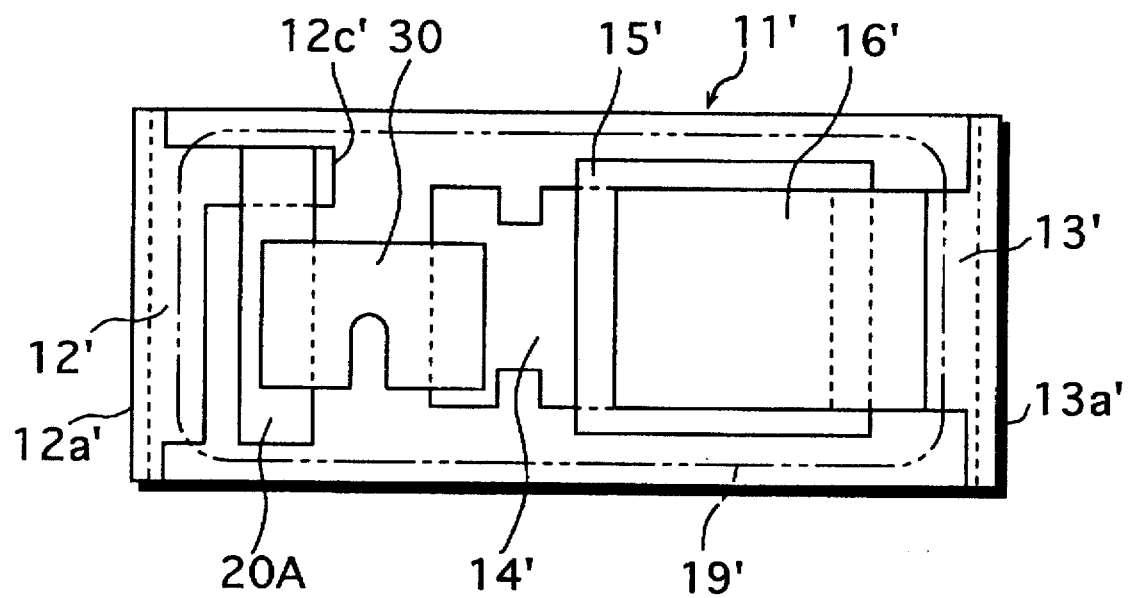
FIG. 17 is a plan view showing still another chip type thick film capacitor embodying the present invention.
Figure 18:
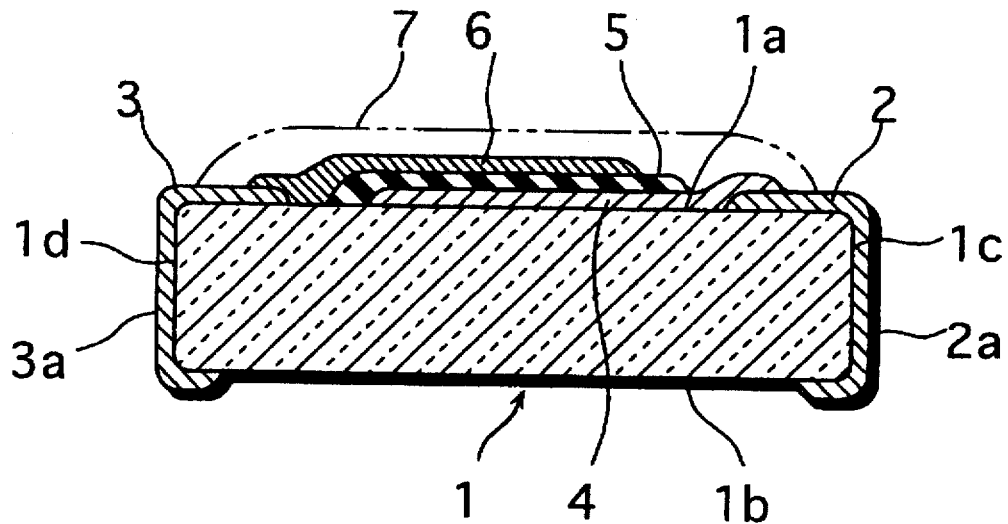
FIG. 18 is a sectional view showing a prior art chip type thick film capacitor.
Figure 19:
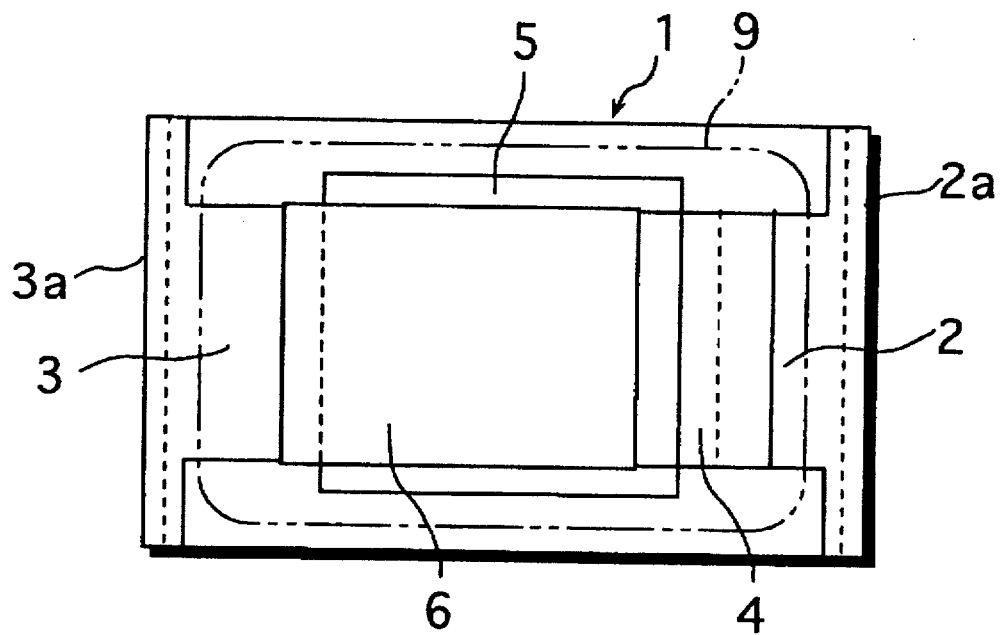
FIG. 19 is a plan view showing the prior art capacitor of FIG. 18.
Figure 20:
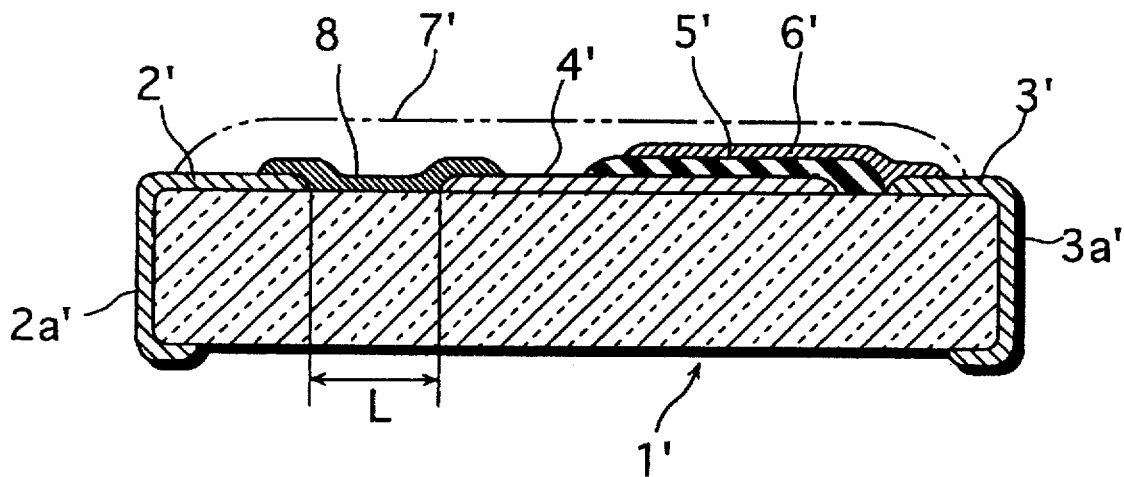
FIG. 20 is a sectional view showing another prior art chip type thick film capacitor.
Figure 21:
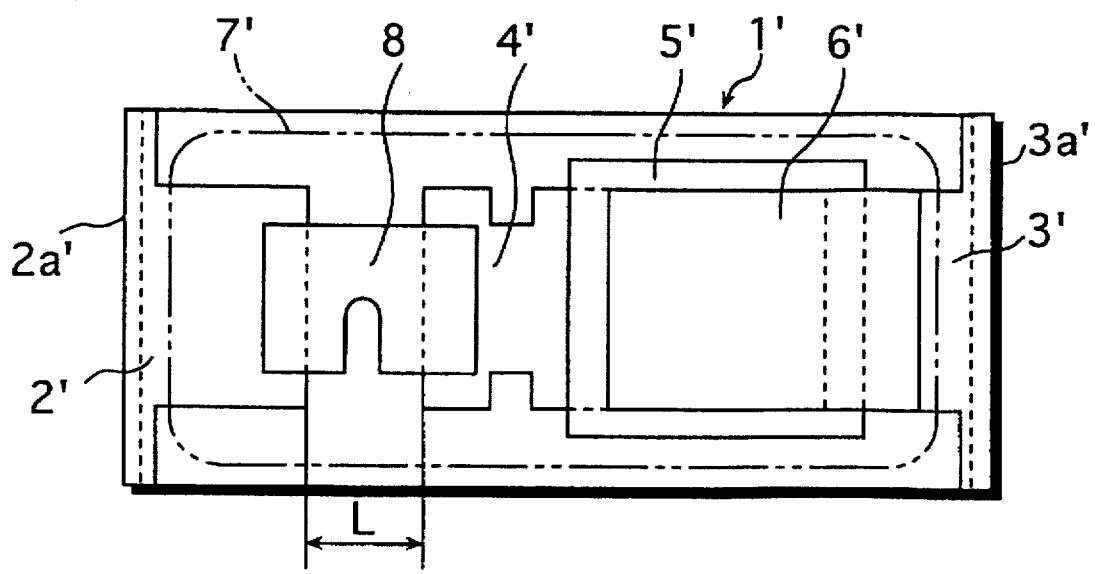
FIG. 21 is a plan view showing the prior art capacitor of FIG. 19.

FIG. 17 shows a chip type thick film capacitor according to a fourth embodiment of the present invention. The capacitor of this embodiment is similar to that of the third embodiment (FIGS. 14 to 16) but differs therefrom only in that the first lead electrode 12' is made to have a single leg portion 12c' which is laterally offset toward one longitudinal edge of the chip 11'.

The preferred embodiments of the present invention being thus described, it is obvious that the same may be varied in many ways. For instance, the extensions 12a, 12a', 13a, 13a' for the first and second lead electrodes 12, 12', 13, 13' may be dispensed with in case where each of the respective lead electrodes is electrically connected to a suitable portion of a circuit board via wire bonding. Such variations are not to be regarded as a departure from the spirit and scope of the present invention, and all such modifications as would be obvious to those skilled in the art are intended to be included within the scope of the following claims.

We claim:

1. A chip type thick film capacitor comprising:

an insulating chip serving as a substrate and having a head surface;

a first lead electrode formed on the head surface of the chip;

a second lead electrode formed on the head surface of the chip and spaced from the first lead electrode;

a first capacitor electrode formed on the head surface of the chip, the first capacitor electrode being electrically connected to the first lead electrode but electrically insulated from the second lead electrode;

a dielectric layer formed on the first capacitor electrode;

a second capacitor electrode formed on the dielectric layer, the second capacitor electrode being electrically connected to the second lead electrode but electrically insulated from the first lead electrode; and an auxiliary electrode formed on the head surface of the chip in electrical conduction with one of the first and second lead electrodes, the auxiliary electrode being spaced from the first capacitor electrode by a predetermined distance.

2. The capacitor according to claim 1, wherein the auxiliary electrode is held in electrical conduction with the second lead electrode and the second capacitor electrode.

3. The capacitor according to claim 1, wherein the auxiliary electrode is held in electrical conduction with the first lead electrode, the first capacitor electrode being electrically connected to the auxiliary electrode via a resistor layer formed on the head surface of the chip between the first capacitor electrode and the auxiliary electrode.

4. The capacitor according to claim 3, wherein the first lead electrode has a pair of laterally spaced leg portions, the auxiliary electrode extending between the leg portions of the first lead electrode, the resistor layer partially overlapping on the auxiliary electrode between the leg portions of the first lead electrode.

5. The capacitor according to claim 3, wherein the first lead electrode has a leg portion which is laterally offset toward one longitudinal edge of the chip, the auxiliary electrode partially overlapping on the leg portion of the first lead electrode, the resistor layer partially overlapping on the auxiliary electrode at a position laterally spaced from the leg portion of the first lead electrode.

6. The capacitor according to claim 1, wherein each of the first and second lead electrode has an extension extending onto a side surface of the chip.

7. A method of making a chip type thick film capacitor, comprising the steps of:

simultaneously forming a first lead electrode and a second lead electrode on a head surface of an insulating chip, the first and second lead electrodes being spaced from each other;

simultaneously forming a first capacitor electrode and an auxiliary electrode on the head surface of the chip, the first capacitor electrode being electrically connected to the first lead electrode, the auxiliary electrode being electrically connected to the second lead electrode but spaced from the first capacitor electrode by a predetermined distance;

forming a dielectric layer on the first capacitor electrode;

forming a second capacitor electrode on the dielectric layer, the second capacitor electrode being electrically connected to the auxiliary electrode.

8. A method of making a chip type thick film capacitor which also incorporates a thick film resistor, the method comprising the steps of:

simultaneously forming a first lead electrode and a second lead electrode on a head surface of an insulating chip, the first and second lead electrodes being spaced from each other;

simultaneously forming a first capacitor electrode and an auxiliary electrode on the head surface of the chip, the first capacitor electrode being spaced from both of the first and second lead electrodes, the auxiliary electrode being electrically connected to the first lead electrode but spaced from the first capacitor electrode by a predetermined distance;

forming a resistor layer on the head surface of the chip to extend between the first capacitor electrode and the auxiliary electrode;

forming a dielectric layer on the first capacitor electrode;

forming a second capacitor electrode on the dielectric layer, the second capacitor electrode being electrically connected to the second lead electrode.

* * * * *